Dec. 12, 1950   J. E. LEININGER ET AL   2,533,480
CLUTCH
Filed April 25, 1945
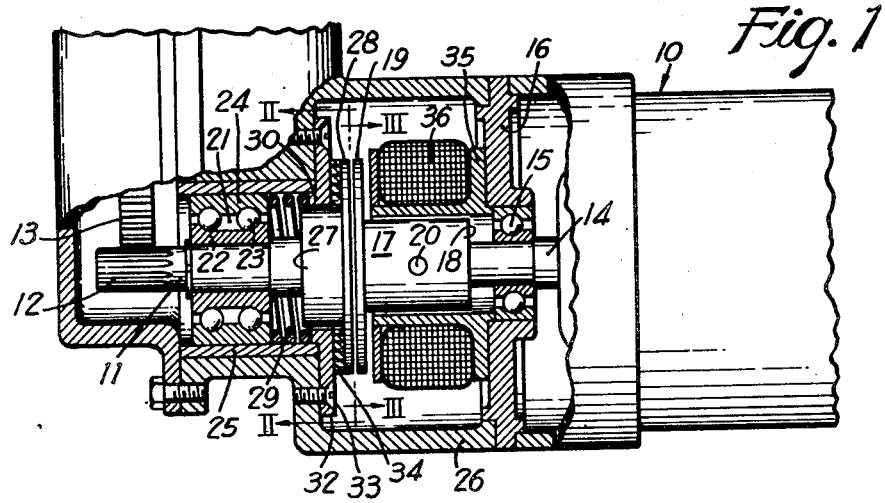
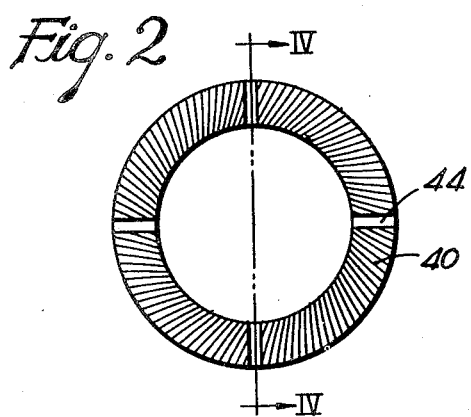
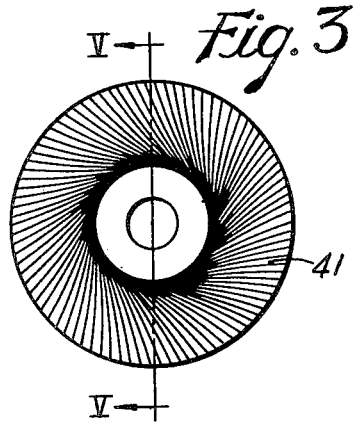
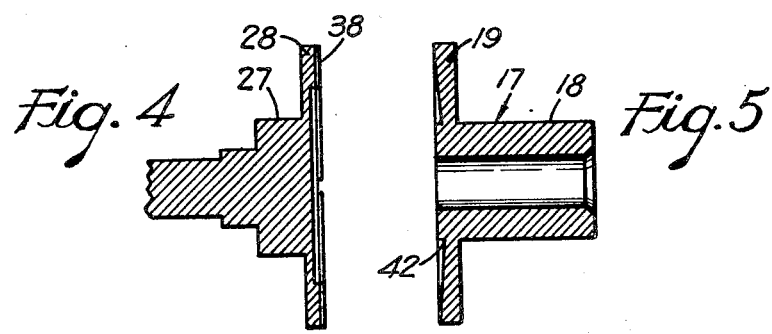
INVENTOR.
J. E. LEININGER
BY C. L. SEATON
Ewoodbury
ATTORNEY Patented Dec. 12, 1950

2,533,480

UNITED STATES PATENT OFFICE 2,533,480

CLUTCH

James E. Leininger and Charles L. Seaton, Burbank, Calif., assignors to Bendix Aviation Corporation, South Bend, Ind., a corporation of Delaware Application April 25, 1945, Serial No. 590,134

2 Claims. (Cl. 192—107)

This invention relates to clutches for intercoupling two rotating members and is particularly useful in magnetic clutches.

An object of the invention is to provide a clutch plate construction that has high holding power relative to the area of the friction faces and the force that urges the plates together.

Another object is to provide a clutch plate construction having good frictional characteristics that can be readily manufactured.

A more specific object is to provide a clutch plate design such that the plates can be completely finished prior to assembly of the clutch and thereby eliminate interfitting the plates by the process of wearing them in after assembly.

Other more specific objects and features of the invention will appear from the detailed description to follow.

Heretofore, it has been considered necessary in the manufacture of some types of clutches employing interengaging metallic plates to fit the plates together after assembly by a process referred to as "burning in," which involves the slipping of the plates with respect to each other until their surfaces are worn to correspond to each other and effect contact over substantially their entire areas. This process is objectionable not only because considerable time is required to complete the "burning in" process, but because in many instances it fails to produce surfaces having sufficient friction to transmit the required torque. Nevertheless, prior to the present invention, the "burning in" process was the only known way of producing the desired frictional characteristics between the clutch plates.

In accordance with the present invention, we eliminate the necessity of "burning in" the clutch plate surfaces by grinding the faces of the plates on the side of a grinding wheel to produce the necessary contour of the faces and, at the same time, provide a finish having high frictional characteristics with respect to the cooperating plate. By grinding the faces of the plates on the side of the grinding wheel, the fine striae or lines produced by the wheel on the ground surface are caused to extend diagonally across the plates with a radial component, whereas when two plates are burned in, the striae extend circumferentially. It has been found by experiment that when the plates are ground so that the striae have a radial component as described, that the friction between the plates is greatly increased and is much more uniform in quantity production than in plates that have been produced by the "burning in" process.

A complete understanding of the invention may be had from the following detailed description of a particular embodiment thereof as disclosed in the drawing in which Fig. 1 is a side elevation view with portions broken away of a mechanism incorporating a magnetic clutch to which the invention is applied.

Fig. 2, is an end view of one of the clutch plates, the view being taken in the plane II—II of Fig. 1.

Fig. 3 is an end view of the other clutch plate, the view being taken in the plane III—III of Fig. 1.

Fig. 4 is a section taken in the plane IV—IV of Fig. 2; and

Fig. 5 is a section taken in the plane V—V of Fig. 3.

Referring first to Fig. 1, there is disclosed a mechanism incorporating an electric motor 10 which is adapted to drive a pinion shaft 11 through a magnetic clutch incorporating the present invention. The pinion shaft 11 carries gear teeth 12 on its end meshing with a driven gear 13 but the mechanism driven by the pinion shaft 11 does not constitute a part of the present invention.

Motor 10 has a shaft 14 which is supported by a ball bearing 15 mounted in a wall 16, shaft 14 extending through the bearing and having mounted on its outer end a driving clutch plate assembly 17 which consists of a hub 18 formed integrally with a flange 19 which constitutes the driving plate of the clutch. The clutch assembly 17 is secured to the shaft 14 by a pin 20 and is rotatably supported against longitudinal movement by the bearing 15. The clutch assembly 17 is made of steel or other paramagnetic material.

The pinion shaft 11 is rotatably supported by a ball bearing 21, the bearing comprising an inner race 22 mounted on the shaft 11, balls 23 and an outer race 24. The outer race 24 has a cylindrical outer surface which is slidably fitted within a stationary sleeve 25 in a clutch casing 26. Formed integrally with the shaft 11 on its inner end is a hub 27, which hub has at its inner edge an outwardly extending flange 28 which forms the driven clutch plate.

The entire assembly, including the driven clutch plate 28 and the bearing 21 is slidable longitudinally in the sleeve 25 to engage and disengage the clutch. As shown in Fig. 1, the clutch is disengaged, in which position the driven plate is moved out of contact with the driving plate 19 by a helical spring 29 which is interposed between a stationary shoulder 30 forming a part of the casing and the outer race 24 of the bearing 21. The shoulder 30 is formed on the inner edge of an annular plate 32 which is secured to the casing 26 by screws 33 and has an annular brake lining 34 on its inner face against which the rear face of plate 28 abuts in disengaged position. Friction between the brake lining 34 and the plate 28 quickly stops rotation of the plate when the clutch is disengaged.

The clutch is engaged by magnetic force. To this end, an energizing winding 36 is provided surrounding the hub 18 of the driving clutch member. The winding 36 is supported by a frame 35 extending from the wall 16.

As previously indicated, the driving plate assembly 17 is of steel or other paramagnetic material. Likewise, the driven plate assembly including the hub 27 and the plate 28 are of steel or other paramagnetic material, although one or the other of the clutch plates may have a non-magnetic surface layer to improve the frictional characteristics. When the winding 36 is energized, the hub 18 of the driving assembly 17 is strongly magnetized and strongly attracts the hub 27 on the driven clutch member. The magnetic force is far in excess of that offered by the spring 29, so that the entire assembly including the pinion shaft 11, the bearing 21, the hub 27, and the plate 28 is moved to the right until the face of the plate 28 engages the face of the plate 19. These faces are supposed to engage each other with sufficient friction to transmit the motion of the motor shaft 14 to the pinion shaft 11 without slippage, but heretofore some difficulty has been encountered in providing the necessary friction between the clutch elements to avoid slippage. The best prior-known method of preventing slippage in use was to "burn" the surfaces of the plates 19 and 28 together until they interfitted over substantially their entire area. However, this required considerable time and there were many rejects.

In accordance with the present invention, the surfaces of the driving and driven members are ground to predetermined shape prior to assembly of the clutch and no "burning in" is employed.

Referring to Fig. 4, the driven plate 28 has its working face 38 ground substantially flat and the grinding is done either on the side of a straight grinding wheel or the face of a cup-type grinding wheel to produce a finish having striae extending at an angle across the annular surface 38 as indicated by the lines 40 in Fig. 2.

The driving plate 19 is likewise finished on the side of a straight grinding wheel or on the face of a cup-type grinding wheel to produce a finish in which the grinding striae 41 (Fig. 3) are complementary to the striae 40 on the driven plate. The driving member 19, however, is ground to produce a dish, that is, the outer edge of the clutch surface is higher than the inner diameter. This is done because it is found that when the plates are urged together by the magnetic force, they are slightly distorted, so that if both plates were initially ground flat, contact would be had only along the inner diameter of the surface 38 when the plates are forced together. This would result in burning, in service. The amount of "dish" imparted to the driving plate 19 depends upon the rigidity of the driving and driven plates, and upon the magnetic force that is developed. The proper dish can be determined by experiment for any particular combination of driving and driven plates and any particular magnetic force that is developed. In a clutch in which the maximum diameter of the plates is $1\frac{1}{16}"$ and in which the plates are approximately $\frac{1}{8}"$ in thickness, with other proportions as indicated in Figs. 4 and 5, it is found that the amount of dish should amount to between .0010" and .0015" measured at the shoulder 42 in Fig. 5. The "dish" is greatly exaggerated in Fig. 5 to make it visible.

As has been previously indicated, one of the surfaces preferably has a coating of a different material, and in Fig. 4 such a coating is shown in the surface 38 of the driven plate. This coating may be of sintered bronze and divided into four quadrants as shown in Fig. 2 with small radial grooves 44 between the quadrants which permits any dust formed by friction between the clutch members to be thrown out by centrifugal force.

If the grinding of the surfaces is done on a wheel of substantial diameter, the striae lines 40 and 41 (Figs. 2 and 3) will appear substantially straight instead of arcuate. However, they always have a slight curvature and it is preferred that the curvatures be in opposite directions as viewed in Figs. 2 and 3 so that when the members are brought together, the lines on one member coincide with lines of the other which will produce the maximum friction between the members. However, it is understood that even though the grinding lines or striae on the two members are not exactly registered when the members are brought together, the friction is substantially higher than on members that are finished by burning them in. In the latter case, the surface finish lines or striae are in the form of circles centered about the axis of rotation of the clutch.

It has been found satisfactory in practice to grind the faces of the plates with a Norton grinding wheel No. 46M5B2 having a surface speed of 6500 feet per minute, while rotating the plate at from 175 to 200 R. P. M. If the grinding lines or striae are either too coarse or too fine, the holding power is decreased, and the optimum texture in any given case can be determined by experiment.

It is to be noted that when one of the faces of the clutch is provided with a coating of non-magnetic material, such as sintered bronze, there is no direct contact between two magnetic materials when the clutch is engaged, and hence there is no tendency for the clutch to stick. The dished surface of the driving member 19 is not for the purpose of overcoming residual magnetism between the members, but to enable the parts to be pre-ground and yet fit over their entire areas when the clutch is engaged despite distortion of one or both of the clutch members.

The present invention relates to clutches in which some slippage is intended for the purpose of accelerating the driven member smoothly and without shock, as distinct from clutches of the type intended to provide instantaneous engagement. In the claims the expression "slip-type" is intended to distinguish from the instantaneous type of clutch without signifying a clutch that slips continuously at all times.

We claim:

1. A slip type clutch comprising: a pair of axially alined rotary driving and driven elements adapted for relative axial movement into and out of frictional engagement with each other in which both of said elements have cooperating, substantially smooth, ground annular friction surfaces having curved grinding striae extending thereacross in a direction having a radial component, said striae being of such curvature and degree of fineness as to provide substantially maximum sliding friction between said elements.

2. A clutch as described in claim 4 including means for applying an axial clutch-engaging force at an area positioned inwardly of the inter-engaging annular friction surfaces for urging said elements into engagement, and in which one of said elements is normally dished to compensate for distortion of the elements when the clutch is engaged and cause said surfaces to engage over substantially their full areas when they are urged together.

JAMES E. LEININGER.
CHARLES L. SEATON.

REFERENCES CITED

The following references are of record in the file of this patent:

UNITED STATES PATENTS

| Number | Name | Date |
|---|---|---|
| 1,018,471 | Zimmerman | Feb. 27, 1912 |
| 1,599,343 | Newdick | Sept. 7, 1926 |
| 1,648,267 | Grossbard | Nov. 8, 1927 |
| 1,898,978 | Lane | Feb. 21, 1933 |
| 2,081,566 | Winkler | May 25, 1937 |
| 2,398,716 | Ojutkangus | Apr. 16, 1946 |

FOREIGN PATENTS

| Number | Country | Date |
|---|---|---|
| 193,064 | Great Britain | Feb. 9, 1923 |